March 10, 1931.　　　　K. SAITO　　　　1,795,895
DIESTOCK
Filed Aug. 8, 1928
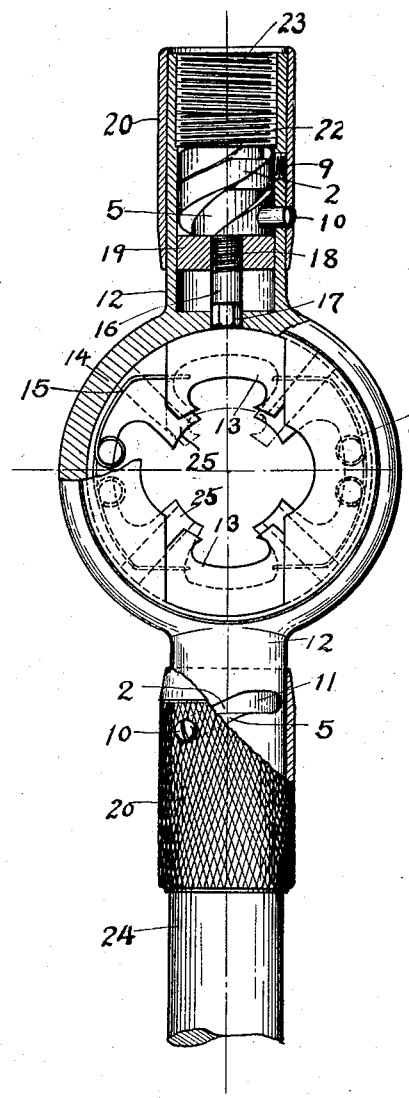
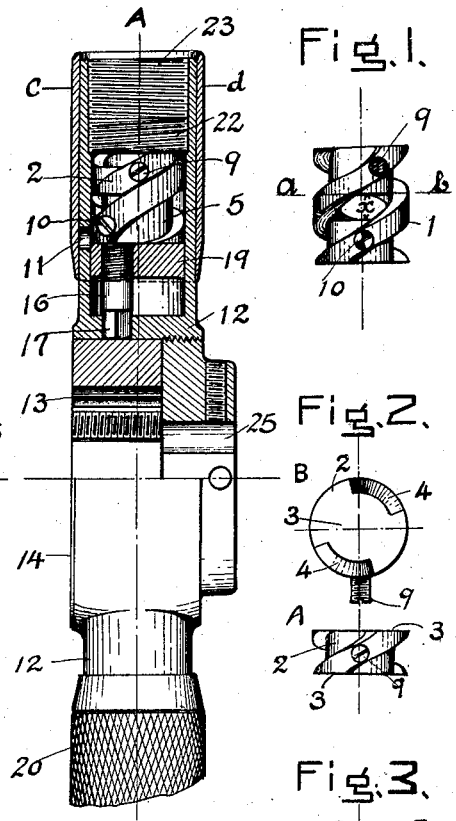
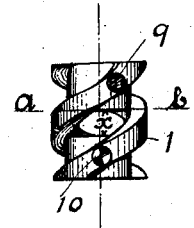
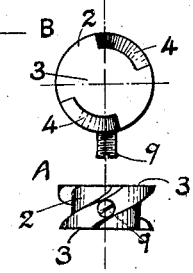
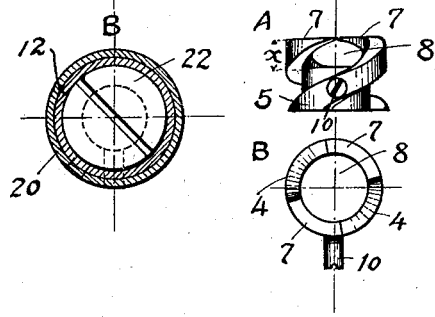
Inventor
KOSAKU SAITO
By Richard Geer
Attorneys Patented Mar. 10, 1931

1,795,895

UNITED STATES PATENT OFFICE

KOSAKU SAITO, OF OSAKI-MACHI, JAPAN

DIESTOCK

Application filed August 8, 1928. Serial No. 298,196.

This invention relates to improvements in die-stocks and has for an object to attain the smooth cutting of fine threads.

A further object of the invention is to quickly and accurately adjust the feed of the dies by means of a spanner without detaching any part of the stock.

A constructional form of the invention is illustrated in the accompanying drawings.

Figure 1 is a side view of a screw threaded rod constituting an interlocking screw which is composed out of two pieces, the divisional line between these pieces being the line $a-b$; Figure 2A is a side view of one of the two screw pieces; Figure 2B is an end view of the piece represented in Figure 2A; Figure 3A is a side view of the second screw piece; Figure 3B is an end view of the screw piece represented in Figure 3A; Figure 4 shows a plan view partly in section of the die-stock according to this invention; Figure 5A is a side view partly in section of the die-stock shown in Figure 4; Figure 5B is a transverse sectional view of the gripping handle.

In the drawings, 1 is a screw threaded rod which consists of two screw pieces 2 and 5 (Figures 2 and 3), the rod 1 being preferably cut into those two pieces along the line $a-b$ shown in Figure 1. The cut face of the piece 5 is bored at 8 to a suitable depth $x$. As shown in Figure 3B, the slopes of the threads 4 are not bored. The fitting end 3 of the screw piece 2 fits into the bore 8 of the piece 5 so that the threads of each piece can come into engagement with each other and thus constitute the interlocking rod 1. This rod, composed of the screw pieces 2 and 5, is inserted into a hollow handle arm 12. In the drawing two handle arms 12 are shown projecting from the opposite sides of the main body 14 of the die-stock. One screw threaded rod 1 is inserted into each of the two handles 12. The screw piece 2 is provided with a set screw 9 which is screwed into an opening in the arm 12, thereby firmly connecting the screw piece 2 with the arm 12. The screw piece 5 is movably arranged within the arm 12 and is provided with a guide pin 10 which projects through a slot 11 in the handle arm 12. A grip 20 fits on the arm 12 and is provided with an opening aligning with an opening of the arm 12 so that the pin 10 projects through both of said openings. The two arms 12 on opposite sides of the die-stock 14 are similar to each other, the two slots 11 being bored in such a way as to lie parallel to each other and at a suitable inclination with respect to the middle axis of the arms 12. When these arms are turned, the pins 10 will be forced outwardly toward the ends of the handles. The sliding pin 16 which is fixed at 18 into the slide 19 extends into the rear face of the die 13 through a hole provided in the die-stock 14 in alignment with the middle axis of the arm 12. The slide 17 of the pin 16 has a hexagonal shape so that it can be engaged by a spanner. The screw dies 13 can thus be quickly and accurately adjusted by means of the spanner without detaching any part of the die-stock.

A pair of springs 15 has its both ends attached to adjacent sides on a pair of dies 13 so that the latter can be released immediately against the inner face of the stock 14 when the grips 20 are turned. 22 is a plate arranged near the outer end of the fixed screw 2 and carried by a screw plug 23 of the arm 20. 24 is a handle which is detachably secured to the screw part 23 of the arm 12.

The device is actuated as follows:

The working piece which is to be cut is firmly supported by a suitable supporter and is also secured at the middle of the die-stock 13 by a chuck 25 in the usual way. Thereafter the grips 20, together with the handles are turned over clockwise or reversely according to the direction of threads to be cut. The movable screw piece 5 must be moved a certain distance $x$ to disengage it from the fixed screw pieces 2, this being accomplished by pins 10 on the screw pieces 5 engaging in the slots 11 and being forced outwardly thereby. The slides 19 with the pins 16 are also pushed by the movable screw pieces 5 and the dies 13 will be pushed out by the pins 16 while the dies 13 are being turned round with the stock 14. When the turning of the stock 14 is stopped, the dies 13 will be released by means of the springs 15 and also if the feeding distance of the dies or the depth of thread to be cut is required to be altered; this can be obtained by adjusting the pin 16 by means of the spanner.

It will be obvious from the above that the dies may be adjusted quickly and accurately without detaching any part of the die-stock by adjusting the pins 16 by means of the spanner and that a fine and accurate thread will be cut as desired.

What is claimed is:—

A die-stock having hollow handle-arms projecting from the opposite sides thereof, a pair of thread screws interlocking with one another in alignment with the longitudinal axis of each of said arms, one of said screws being fixed while the other is movable, guide pins projecting from the movable screws and through said arms, the latter being provided with slots inclined with respect to the longitudinal axis of said arms, elongated to receive said pins, said slots having an elongated shape to enable the movable screw to be released from locking position with the fixed screw, a grip fitted on each hollow arm, a sliding pin interposed between each movable screw and the rear of a die in said stock, said pin being slidable in alignment with the longitudinal axis of the arm, and a slide in each arm to which said sliding pin is adjustably connected, said slide being retracted when the movable screw has reached said unlocked position.

In testimony whereof I have affixed my signature.

KOSAKU SAITO.